3,437,580
PREPARATION OF HYDROUS METAL OXIDE
MEMBRANES AND ACID SALTS THEREOF
Frank C. Arrance, Costa Mesa, and Carl Berger, Corona del Mar, Calif., assignors, by mesne assignments, to McDonnell Douglas Corporation, Santa Monica, Calif., a corporation of Maryland
Filed Nov. 29, 1963, Ser. No. 326,709
Int. Cl. B01k 3/10; B01d 13/04
U.S. Cl. 204—295      30 Claims This invention relates to the preparation of ion permselective membranes from inorganic materials and is directed particularly to methods of manufacture of inorganic membranes for use in water demineralization, radioisotope decontamination, demineralization of other aqueous solutions such as sugar, milk solutions, and polluted waters and demineralization of other non-aqueous solutions by means of electrodialysis.

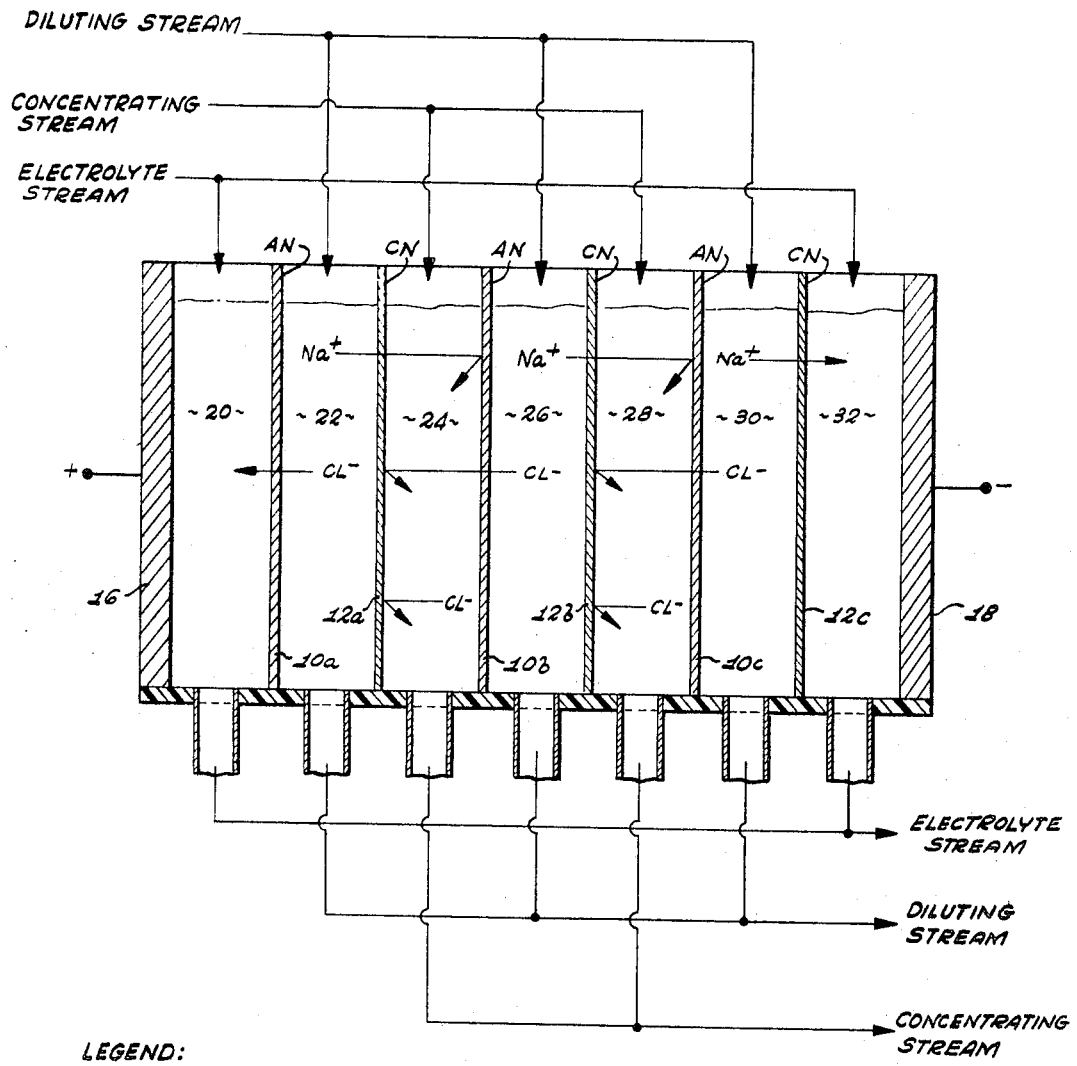
LEGEND:
AN = ANION MEMBRANE (Sb₂O₃)
CN = CATION MEMBRANE (MoO₂)
INVENTORS
CARL BERGER
BY FRANK C. ARRANCE
Fulwider, Patton, Rieber,
Lee, and Utecht
ATTORNEYS United States Patent Office 3,437,580
Patented Apr. 8, 1969

In the past demineralization of soluble ionic contaminants of water, and other aqueous solutions, by electrodialysis have employed organic ion exchange membranes either in homogeneous form backed with a supporting material, or in heterogeneous membranes where the active ion selective particles are grafted onto a plastic material such as polyethylene or polypropylene. However, such organic membranes have numerous critical limitations. Generally, these involve rapid fouling or plugging of the membrane, lack of ability of the membrane to selectively transport specific ions, degradation at elevated temperature, and high cost of membranes. More specifically, with regard to the field of demineralization of the soluble ionic contaminants of sea water, organic membranes currently employed in electrodialysis procedures do not permit selective passage of $Ca^{++}$ or $Mg^{++}$. If passage of these ions were achieved, higher current densities could be attained. Also, less calcium salt or magnesium salt deposition on or within the membrane (e.g. as $CaSO_4$ or $MgSO_4$) would occur.

Generally, greater ion transport is possible at higher temperatures of operation of an electrodialysis cell; however, the use of organic membranes severely limits the temperatures at which such cells can operate without degradation. Further, organic membranes are susceptible to bacterial action, have relatively low capacity, and furthermore, do not have great selectivity with respect to separation of polyvalent ions from univalent ions.

Inorganic ion exchangers are known in particulate form which, to some extent, alleviate the aforementioned disadvantages of the organic membranes. However, to our knowledge, inorganic permselective membranes have not been made, prior to our invention, for electrodialysis purposes, with any degree of success. It will be appreciated that particulate inorganic ion exchangers such as those described by Kraus et al., in their paper entitled "Ion Exchange Properties of Hydrous Oxides" given at the Second United Nations Conference on Peaceful Uses of Atomic Energy, Geneva, 1958, paper 1832, are essentially employed in typical ion-exchange processes wherein the particulate ion exchangers adsorb certain specific ions by ion exchange mechanism, and these specific ions are then eluted by suitable solutions, and the ion-exchange material is then regenerated. It will be seen that in the use of particulate ion-exchange materials, only a batch demineralization of soluble ionic contaminants can take place.

One of the major advantages of an electrodialysis process employing permselective membranes is its ability to demineralize soluble ionic contaminants on a continuous basis, inasmuch as the ions to be taken from solution can be actually selectively "screened" through the membranes under the influence of an electric field.

Basically, electrodialysis is a process in which ionized molecules or atoms are continuously transferred through selective ion-transfer membranes under the influence of a direct current. If a solution containing positively and negatively charged ions is fed to an electrodialysis cell, the cations will be attracted to the negatively charged cathode and the anions will be attracted to the positively charged anode. The nature of the ion-transfer membrane between the solution and electrodes determines whether or not an ion can migrate through it or be retained by the solution. Anion transfer membranes will allow the passage of anions but exclude cations, while cation exchange membranes will allow the passage of cations but not anions.

Heretofore, the problem basically has been to provide a method or methods whereby inorganic ion exchange materials, such as those hydrous oxides noted by Kraus et al., as well as others, can be made up in membrane form while still having permselective properties, low resistivity and high strength for electrodialysis applications.

In view of the foregoing, it is a major object of the present invention to provide a method for making a strong inorganic membrane of a wide variety of hydrous metal oxide and acid salts thereof having cation and anion permselective properties.

It is another object of the present invention to provide a novel method for the making of inorganic membranes of many hydrous metal oxides and acid salts thereof having permselective properties and which can be employed at temperatures of 125° C., or higher, without degradation.

It is still another object of the present invention to provide a novel method for the making of inorganic membranes of many hydrous metal oxides and acid salts thereof which will permit selective passage therethrough of particular ions and have low resistivity and high strength.

Yet another object of the present invention is to provide a novel method for the making of inorganic membranes of hydrous metal oxides and acid salts thereof for electrodialysis purposes having improved anti-fouling and anti-bacterial properties in comparison with organic membranes of the prior art.

These and other objects of the present invention will become clear by referring to the following detailed description.

For the purposes of this invention, the term "ion exchanger" is a solid material which has a network, lattice, or matrix to which are fixed either negative or positive charges. In order to preserve electrical neutrality, the solid contains mobile or displaceable ions of opposite charge (counter ions). If the lattice is formed of fixed negative charges, the mobile or displaceable ions will be positively charged and the material is known as a cation exchanger. If the lattice contains a fixed positively charged network, the mobile or displaceable ions are negatively charged, and the material is known as an anion exchanger. The term "insoluble hydrous metal oxides" includes those water-insoluble solids containing one or more metal cations, oxide ions, hydroxide ions, and an indeterminate quantity of water, and includes hydrous hydroxides. The hydrous metal oxides do not necessarily have a definite stoichiometric combination or a definite crystal structure and they may contain ionic impurities as well.

The membranes of our invention are prepared from water-insoluble hydrous metal oxide ion exchangers and acid salts thereof. The water-insoluble hydrous metal oxides with which this invention is primarily concerned are the water-insoluble hydrous oxides of metals selected from the following groups of elements in the Periodic Table: III-A, III-B, IV-A, IV-B, V-A, V-B, VI-B, VII-B, VIII, the Lanthanide Series and the Actinide Series. The elements of group VI-A (aside from oxygen), arsenic, phosphorus and tantalum are functional in our invention as part of an anion in an acid salt as will be seen hereafter.

In general, the hydrous metal oxides of our invention are prepared by first precipitating the hydroxide of the particular metal involved from a water-soluble salt solution of the metal, the solution having a water-soluble hydroxide therein. The hydrous metal oxides of the metals W, Mo, V, Nb and Ta, are however, preferably precipitated from acid solution. The precipitate is then filtered and dried at a relatively low temperature to form an insoluble hydrous oxide having some bound water therein. For example, zirconium hydroxide is formed by precipitation with $NH_4OH$ from a solution, containing zirconium nitrate, at a pH of 8. It is then filtered from solution, and dried at about 200° C. for twenty-four hours to convert it to hydrous zirconium oxide (see Example No. V hereafter for specific details).

The hydrous metal oxides of our invention, so prepared, are then reacted with a cementing substance that preferably has ion exchange properties, in and of itself, is highly electrically conductive, and strongly adhesive. Zirconium phosphate, titanium phosphate and zinc phosphates are examples of this type of preferred cement. In general, insoluble acid salts such as the insoluble arsenates, borates, tungstates, vanadates, phosphomolybdates, molybdates, and phosphates have the desired properties. Also, hydraulically setting cements, such as calcium aluminate, or the calcium-alumino-silicates are also employed. Further, various organic materials such as thermosetting plastic resins (e.g., epoxy resins) may sometimes be employed although they would generally not be considered preferable materials for the purpose of the invention because of low electrical conductivity.

It has been found that the hydrous metal oxides of our invention must be only partially hydrated, in order that they be reactive with the above-described cementing or bonding compounds. Thus, if a hydrous metal oxide were to be employed being hydrated to one hundred percent of its total water capacity, it is believed that the available reactive sites in the hydrous metal oxides are occupied by the water thereby preventing desired reactions with the adhesive or cementing agent. On the other hand, if the hydrous metal oxide were dried at a substantially higher temperature than is employed in the present invention, for example at 1000° C., the hydrous metal oxide would be converted into a condensed ceramic structure and would have negligible ion exchange capacity and negligible ion-transfer capacity in an electrodialysis cell.

In general, it has been found that the preferred amounts of bound water in the hydrous metal oxides of our invention is to be in excess of more than about one percent and is to be less than about 50 percent of the total amount of water that could be bound, in any way, by the particular hydrous metal oxide involved. In most instances, the amount of bound water required in the particular hydrous metal oxide is less than 10 percent of the total water that can be bound (i.e. held chemically or physically) by that hydrous metal oxide.

The correct amount of bound water for a particular hydrous metal oxide is generally achieved by a relatively low-temperature drying after precipitation as explained above. Thus, the temperature of drying should ordinarily not be above about 500° C.

Particulate forms of hydrous metal oxides so prepared cannot be pressed and sintered to form a cohesive membrane even when pressures of the order of 20,000 p.s.i. or higher are exerted on the particles in a die. When the particulate forms of the hydrous metal oxides are, however, admixed with an insoluble acid such as a metal phosphate or a metal borate or if another adhesive agent such as calcium alumino-silicate is employed, and the oxide is then pressed and sintered, membranes are produced having substantial ion-exchange capacity, good conductivity and high strength suitable for electrodialysis and other purposes. The hydrous metal oxides, bound in accordance with the foregoing has some cohesiveness prior to sintering; the sintering under pressure imparts strength to the membrane.

It has been found that very minor amount, i.e., above 5 percent by weight, of the hydrous metal oxide of an insoluble metal phosphate, other insoluble acid salt, silicate, or alumino-silicate may be employed as the bonding agent for the membrane preparation with good results. The amount of insoluble adhesive can be increased to as high as 50 percent of the hydrous metal oxide with increasing structural strength and without adverse conductivity or adverse ion-exchange capacity.

The pressure requirements for good membrane formation of the hydrous metal oxides of our invention, of course, depend upon the precise materials involved and the particular use in the electrodialysis process to which the membrane is to be put. It can be stated that the pressures will ordinarily range between 2000 p.s.i. and 20,000 p.s.i. The temperature at which the membrane is sintered cannot, of course, be so high that the ion exchange capacity is lost. Ordinarily for most applications the sintering temperature for the hydrous metal oxides of the invention should be above 150° C., but below 500° C.

The ion exchange properties of many of the water insoluble hydrous metal oxide membranes prepared in accordance with the foregoing are related to the pH of the solution with which they are in contact as are their particulate forms. On the acid side of their isoelectric points, certain hydrous metal oxides are anion exchangers, while on the basic side they are cation exchangers. This may be explained as occurring because of the nature of the molecular surface of these solids. At pH values below the isoelectric point the surface acts as though it were covered with positive charges, and negatively charged groups are thus attracted and held by it. At pH values above the isoelectric point, the converse occurs; the surface becomes negatively charged, and cations are attracted and absorbed. Examples of such hydrous metal oxides are $Zr(IV)$, $Sn(IV)$, $Ta(V)$, $Ti(IV)$, $Cr(III)$, $Fe(III)$, $Nb(V)$ and $Al(III)$. Certain other hydrous metal oxides, however, possess predominantly cation exchange properties regardless of pH. Examples are $Mo(VI)$, $W(VI)$, $U(VI)$ and $V(V)$. Further, other hydrous metal oxides, such as $Th(IV)$ and $Bi(III)$ have predominantly anion exchange characteristics. It will be appreciated, from the foregoing, that the amphoteric properties of certain of the hydrous metal oxides and membranes formed from them, as described, can be employed to cause specific changes in cation or anion selectivity—by slight alteration of the pH of the solution to be treated. Also, the selectivity of the membrane can be completely inverted, e.g., a cation-selective material may be changed into an anion-selective membrane by greater pH alteration of the pH of the solution to be treated.

The following examples illustrate the preparation of hydrous metal oxide membranes in accordance with our invention. Metal cations of the insoluble hydrous metal oxides are selected from Groups III to VIII of the Periodic Table, the Lanthanide series and the Actinide series in order to illustrate the broad scope of the invention. The elements of the Group VI-A are functional as part of an acid salt as are the elements P and N. The metals forming insoluble hydrous metal oxides, which are of the greatest practical importance at the present time are the cations of $Al(III)$, $Ga(III)$, $In(III)$, $Sc(III)$, $Y(III)$, $Zr(IV)$, $Ti(IV)$, $Hf(IV)$, $Pb(II)$, $Si(IV)$, $Ge(IV)$, $Sn(IV)$, $Sb(III, V)$, $Bi(III)$, $As(V)$, $V(V)$, $Nb(V)$, $Ta(V)$, $Cr(III)$, $Mo(IV, VI)$, $W(IV, VI)$, $Mn(IV)$, $Re(IV)$, $Tc(IV)$, $Fe(III)$, $Co(II)$, $Ni(II)$, $Ac(III)$, Th(III), U(IV, VI), Pu(IV), La(III), Ce(IV), and Yb(III).

GROUP III

Example I

One hundred grams of $ScCl_3$ were dissolved in 500 cc. of water. $Sc(OH)_3$ was formed by precipitation with $NH_4OH$ at pH 8. The $Sc_2O_3$ was then dried at 200° C. for 24 hours. Twenty grams of $Sc_2O_3$ were mixed with 5 grams of concentrated phosphoric acid and 5 grams of zirconium oxide in a ball mill for 18 hours. The material was dried at 160° C. for 15 hours, granulated and pressed into 2″ diameter membranes at 15 tons total load.

These membranes had an ion exchange capacity of 4.1 meq./gm. Their conductivity was 0.03 ohm$^{-1}$-cm.$^{-1}$ at 90° C. and 60% relative humidity (R.H.) and the modules of rupture was 1.020 p.s.i.

Membranes prepared directly from hydrous $Sc_2O_3$ without zirconium phosphate cement had no measurable strength.

Pressures ranging from 2,000 p.s.i. to 20,000 p.s.i. are operative. The pressed membranes can be sintered at temperatures varying between about 150° C. and 500° C. for from four hours to seventy-two hours. These pressure and temperature variations are applicable to the hydrous metal oxides of our invention.

Example II

Insoluble hydrous Yttrium oxide was prepared by dissolving 100 grams of $YCl_3 \cdot H_2O$ in 500 cc. of water and precipitating $Y(OH)_3$ with $NH_4OH$ at pH 11. The $Y(OH)_3$ was washed and filtered and dried at 200° C. for 24 hours to form insoluble hydrous $Y_2O_3\ x\ H_2O$.

Twenty grams of hydrous $Y_2O_3 x H_2O$ were mixed in a ball mill for 18 hours with 5 grams of concentrated phosphoric acid and 5 grams of $ZrO_2$. This material was dried at 150° C. for 15 hours, granulated, and pressed into 2-inch diameter membranes at 15 tons total load.

These membranes had an ion exchange capacity of 3.9. Conductivity was at 90° C. and 60 percent relative humidity (R.H.) was 0.03 ohm$^{-1}$-cm.$^{-1}$, and the membrane strength, as measured by the modulus of repture was 1,310 p.s.i. Membranes pressed from hydrous $Y_2O_3 x H_2O$ without the addition of zirconium phosphate cement had no measurable strength.

Example III

Insoluble hydrous $Al_2O_3 x H_2O$ was formed by dissolving 200 grams of $Al(ClO_3)_3 \cdot 6H_2O$ in 500 cc. of water and precipitating aluminum hydroxide with $NH_4OH$ at pH 9. The washed and filtered precipitate was dried at 500° C. for 24 hours to form a mixture of $Al_2O_3 x H_2O$ and alpha monohydrate ($Al_2O_3 \cdot H_2O$). One hundred grams of this material were ball milled with 20 grams of $ZrO_2$ for 18 hours. This mixture was dried for 24 hours at 160° C., granulated and pressed into 2-inch diameter membranes .030 inch thick at 15 tons total load. The membranes were sintered for 24 hours at 500° C.

These membranes had an ion exchange capacity of 3.5 meq./gm. and a conductivity of 0.03 ohm$^{-1}$-cm.$^{-1}$ at 90° C. and 60 percent R.H., and the modulus of rupture was 1,250 p.s.i. Membranes compacted from hydrous $Al_2O_3 x H_2O$ without the addition of zirconium phosphate content were too weak to measure for strength

GROUP IV

Example IV $Ti(OH)_4$ was formed by precipitation with $NH_4OH$ from a solution containing 500 g. of $TiCl_3$ and an oxidizing agent, such as $H_2O_2$ at pH 11. $TiCl_4$, $Ti(C_2O_4)_4 \cdot 10H_2O$ or any other soluble salt could be used instead of $TiCl_3$.

The titanium hydroxide was then heated at 200° C. for 24 hours to convert it to insoluble hydrous titanium dioxide ($TiO_2 x H_2O$).

One hundred grams of hydrous titanium dioxide were mixed together in a ball mill for 18 hours with 30 grams of phosphoric acid and 30 grams of $ZrO_2$. After ball milling, the mixture was dried in an oven for 15 hours at 160° C. and granulated to a −32 +80 mesh particle size.

Two-inch diameter by .020-inch thick membranes were pressed from this mixture at a pressure of 15 tons total load. Again, pressures ranging from 2,000 p.s.i. to 20,000 p.s.i or greater are operative The pressed membrane. sintered at 300° C. for 24 hours. The sintering temperature can be varied between 150° C. and 500° C. and sintering time can range from 4 hours to 72 hours.

The resulting membrane had an ion-exchange capacity of 3.2 meq./gm. The conductivity at 90° C. and 60 percent R.H. was .02 ohm$^{-1}$-cm.$^{-1}$ as measured by an AC bridge. The strength of the sintered membrane was 950 p.s.i., as determined by the modulus of rupture.

Example V

A similar procedure was used to prepare insoluble hydrous $ZrO_2 x H_2O$ by precipitation of the hydroxide from an aqueous solution of pH 8 containing $NH_4OH$ and $Zr(NO_3)_4 5H_2O$. The hydroxide was then dried at 200° C. for 24 hours to form insoluble hydrous $ZrO_2 x H_2O$. When bonded with zirconium phosphate cement as described above, a membrane having an ion-exchange capacity of 4.1 meq./gm. resulted. The conductivity at 90° C. and 60 percent R.H. was 25 ohm$^{-1}$-cm.$^{-1}$, and the modulus of rupture was 1,800 p.s.i.

Example VI

Insoluble hydrous stannic oxide ($SnO_2 x H_2O$) was prepared by dissolving 200 grams of $SnCl_4 x 5H_2O$ in 500 cc. of water and precipitating $Sn(OH)_2$ with $NH_4OH$ at pH 9. The precipitate was washed and filtered and dried at 200° C. for 24 hours.

Twenty grams of hydrous $SnO_2 x H_2O$ were ball milled for 18 hours with 4 grams of concentrated phosphoric acid and 4 grams of $ZrO_2$. This material was dried for 15 hours at 160° C., granulated, and pressed into 2-inch membranes .030 inch thick. The membranes were sintered at 500° C. for 24 hours. Ion-exchange capacity of the membranes was 3.3 meq./gm.; conductivity was .03 ohm$^{-1}$-cm.$^{-1}$ at 90° C. and 60 percent R.H.; and the modulus of rupture was 950 p.s.i.

Membranes prepared from insoluble hydrous tin oxide, prepared as above but without the addition of zirconium phosphate cement, were weak and crumbly, and the strength could not be measured.

Example VII

Insoluble hydrous lead oxide was prepared by precipitation of the hydroxide from a solution of 200 grams of $Pb(C_2H_3O_2)_2 \cdot 3H_2O$ in 500 cc. of $H_2O$ at pH 8. The precipitate was washed, filtered and dried at 200° C. for 24 hours.

Twenty grams of $PbO x H_2O$ were ball milled with 5 grams of phosphoric acid and 5 grams of zirconium oxide for 18 hours. This material was dried for 15 hours at 160° C., pressed into 2-inch diameter membranes, .030 inch thick, at 15 tons total load. After sintering for 24 hours at 300° C., the membranes had an ion-exchange capacity of 3.4 meq./gm.; conductivity was .03 ohm$^{-1}$-cm.$^{-1}$ at 90° C. and 60 percent R.H.; and the modulus of rupture was 910 p.s.i.

GROUP V

Example VIII

Insoluble hydrous $Nb_2O_5 \cdot x H_2O$ was prepared by dissolving 200 grams of $Na_3NbO_4$ in 500 cc. of water and precipitating the acidic oxide with 1.0 M $HNO_3$ at pH 2. The precipitate was washed, filtered and dried at 200° C. for 24 hours.

Twenty grams of hydrous $Nb_2O_5 \cdot x H_2O$ were ball milled with 10 grams of concentrated phosphoric acid and 5 grams of $ZrO_2$ for 18 hours. This material was dried for 15 hours at 160° C., granulated, and pressed into 2-inch diameter membranes .020 inch thick at 15 tons total load.

After sintering for 24 hours at 300° C., the membranes had an ion-exchange capacity of 3.8 meq./gm. Their conductance was .04 ohm$^{-1}$-cm.$^{-1}$ at 90° C. and 60 percent R.H., and the modulus of rupture was 975 p.s.i. Membranes prepared from hydrous Nb$_2$O$_5$xH$_2$O without zirconium phosphate cement were too weak to test for strength.

Example IX

Insoluble hydrous antimony trioxide (Sb$_2$O$_3$xH$_2$O) was prepared by dissolving 200 grams of SbBr$_3$ in 500 cc. of water and heating the solution for 24 hours at 100° C. The precipitate, thus formed, was washed, filtered and dried for 24 hours at 200° C. to form hydrous antimony trioxide.

Twenty grams of Sb$_2$O$_3$xH$_2$O were ball milled with 5 grams of concentrated phosphoric acid and 10 grams of ZrO$_2$ for 18 hours. This material was then dried for 15 hours at 160° C., granulated, pressed into 2-inch diameter membranes, .020 inch thick, at 15 tons total load. These membranes were sintered at 300° C. for 24 hours.

The ion-exchange capacity was 3.3 meq./gm.; conductivity was .03 ohm$^{-1}$-cm.$^{-1}$ at 90° C. and 60 percent R.H.; and the modulus of rupture was 1,050 p.s.i. When membranes were prepared from hydrous antimony trioxide without the addition of zirconium phosphate cement, they were weak and crumbly and the strength could not be measured.

GROUP VI

Example X 200 grams of Na$_3$MoO$_4$ were dissolved in water and the oxide was precipitated with HCl at pH 2. The precipitate was dried at 200° C. for 24 hours to form hydrous Mo$_2$O$_3$xH$_2$O.

20 grams of hydrous molybdenum oxide $$(Mo_2O_5 \cdot xH_2O)$$

were ball milled with 5 grams of phosphoric acid and 5 grams of ZrO$_2$ for 18 hours. This material was then dried for 15 hours at 160° C., granulated, and pressed into 2-inch diameter .020-inch thick membranes at 15 tons total load. After sintering at 300° C. for 24 hours, the membranes had an ion-exchange capacity of 3.1 meq./gm.

The conductivity at 90° C. and 60% R.H. was .02 ohm$^{-1}$-cm.$^{-1}$ and the modulus of rupture was 950 p.s.i. Membranes prepared from hydrous Mo$_2$O$_5$xH$_2$O without zirconium phosphate cement were weak, and their strength could not be measured.

Example XI

Insoluble hydrous tungsten oxide WO$_3$xH$_2$O was prepared by dissolving 200 grams of Na$_2$WO$_4$ in 500 cc. water and precipitating the oxide with HCl at pH 1.5. After washing and filtering, the precipitate was dried for 24 hours at 200° C. to form hydrous WO$_3$xH$_2$O. Twenty grams of WO$_3$xH$_2$O were ball milled with 5 grams of concentrated phosphoric acid and 5 grams of ZrO$_2$ for 18 hours. This material was dried for 15 hours at 160° C., granulated, pressed into 2" diameter membranes .030 inch thick at 15 tons total load and sintered at 300° C. for 24 hours.

These membranes had an ion-exchange capacity of 3.0 meq./gm.; conductivity was .03 ohm$^{-1}$-cm.$^{-1}$ at 90° C. and 60 percent R.H., and the modulus of rupture was 870 p.s.i. Membranes prepared from hydrous WO$_3$xH$_2$O without zirconium phosphate cement had no measurable strength.

GROUP VII

Example XII

Hydrous manganese dioxide MnO$_2$xH$_2$O was precipitated from an aqueous solution by adding an 8% solution of manganous chloride to a solution of 2 M NH$_4$OH and 1 M bromine. After washing and filtering the precipitate was dried for 24 hours at 200° C. to form MnO$_2$xH$_2$O.

100 grams of MnO$_2$xH$_2$O were ball milled with 25 grams of ZrO$_2$ and 50 grams of phosphoric acid for 18 hours. This material was dried for 15 hours at 160° C., granulated, pressed into 2" discs .020" thick at 15 tons total load and sintered at 300° C. for 24 hours. These membranes had an ion-exchange capacity of 3.0 meq./gm.; conductivity was .03 ohm$^{-1}$-cm.$^{-1}$ at 90° C. and 60% R.H.; and modulus of rupture was 980 p.s.i.

GROUP VIII

Example XIII

Insoluble hydrous ferric oxide Fe$_2$O$_3$xH$_2$O was formed by dissolving 200 grams of Fe(NO$_3$)$_3$·6H$_2$O in 500 cc. of water and precipitating the hydroxide with NH$_4$OH at pH 11. After washing and filtering, the precipitate was dried for 24 hours at 200° C. to form hydrous Fe$_2$O$_3$xH$_2$O.

Twenty grams of Fe$_2$O$_3$xH$_2$O were ball milled with 9 grams of concentrated phosphoric acid and 9 grams of ZrO$_2$ for 18 hours. This material was dried for 15 hours at 160° C., granulated, and pressed into 2-inch diameter membranes .020 inch thick, at 15 tons total load. The membranes were sintered at 300° C. for 24 hours.

These membranes had an ion-exchange capacity of 3.8 meq./gm.; conductivity was .025 ohm$^{-1}$-cm.$^{-1}$ at 90° C. and 65 percent R.H., and the modulus of rupture was 1,010 p.s.i. Membranes prepared from hydrous $$Fe_2O_3xH_2O$$

without the addition of zirconium phosphate cement were crumbly and their strength could not be measured.

Example XIV

Insoluble hydrous cobalt oxide CoOxH$_2$O was prepared by dissolving 200 grams of CoSO$_4$·H$_2$O in 500 cc. of water and precipitating Co(OH)$_2$ with NH$_4$OH at pH 8. After washing and filtering the precipitate was dried at 200° C. for 24 hours to form hydrous CoOxH$_2$O.

Twenty grams of hydrous CoOxH$_2$O were ball milled with 8 grams of concentrated phosphoric acid and 8 grams of ZrO$_2$ for 24 hours. This material was dried at 160° C. for 15 hours, granulated, pressed into 2-inch diameter membranes .030 inch thick, at 15 tons total load and sintered at 300° C. for 24 hours.

These membranes had an ion-exchange capacity of 3.1 meq./gm.; conductivity at 90° C. and 60 percent R.H. was .03 ohm$^{-1}$-cm.$^{-1}$; and the modulus of rupture was 890 p.s.i.

Example XV

Insoluble hydrous nickel oxide NiOxH$_2$O was prepared by dissolving 200 grams of NiCl$_2$·6H$_2$O in water and precipitating the hydroxide with NH$_4$OH at pH9. After washing and filtering, the precipitate was dried at 200° C. for 24 hours to form NiOxH$_2$O.

Twenty grams of NiOxH$_2$O were ball milled with 5 grams of concentrated phosphoric acid and 5 grams of ZrO$_2$ for 18 hours. This material was dried for 15 hours at 160° C., granulated, pressed into 2-inch diameter discs .020 inch thick at 15 tons total load and sintered at 300° C. for 24 hours. These membranes had an ion-exchange capacity of 3.2 meq./gm.; conductivity was .03

$$ohm^{-1}\text{-}cm.^{-1}$$

at 90° C. and 60 percent R.H.; modulus of rupture was 975 p.s.i.

Example XVI

Hydrous titanium dioxide was prepared as described in Example IV. One hundred grams of this material were ball milled with 25 grams of ZnO and 25 grams of concentrated phosphoric acid for 18 hours. After ball milling, this material was dried for 15 hours at 150° C., granulated to −32 +80 mesh and pressed into 2-inch diameter membranes .030 inch thick, at 15 tons total load. The membranes were sintered at 300° C. for 24 hours.

The sintered membranes had an ion-exchange capacity of 3.1 meq./gm.; conductivity at 90° C. and 60 percent R.H. was .025 ohm$^{-1}$-cm.$^{-1}$ and the modulus of ruputre was 1,015 p.s.i.

Example XVII—Lanthanide series

Insoluble hydrous cerium oxide ($Ce_2O_3xH_2O$) was prepared by dissolving 200 grams of $Ce(NO_3)_3 \cdot 6H_2O$ in 600 ml. of water and precipitating the hydroxide with $NH_4OH$ at pH 10.

$$Ce(NO_3)_3 + 3NH_4OH \rightleftharpoons Ce(OH)_3 + 3NH_4NO_3$$

After washing and filtering, the precipitate was dried for 24 hours at 200° C. to form $Ce_2O_3xH_2O$.

$$2Ce(OH)_3 \rightleftharpoons Ce_2O_3xH_2O$$

100 grams of $Ce_2O_3xH_2O$ were ball milled with 10 grams of zirconium oxide and 20 grams of concentrated phosphoric acid for 18 hours. This material was dried for 15 hours at 160° C., granulated, pressed into 2-inch diameter discs .020″ thick at 15 tons total load and sintered at 300° C. for 24 hours. The cerium ion is probably oxidized to +5 valence state, at this point.

These membranes had an ion-exchange capacity of 3.6 meq./gm.; the conductivity was .03 ohm$^{-1}$-cm.$^{-1}$ at 90° C. and 60% R.H.; and the modulus of rupture was 1,012 p.s.i.

Example XVIII—Actinide series

Insoluble hydrous thorium oxide ($ThO_2xH_2O$) was formed by dissolving 100 grams of $ThCl_1$ in water and precipitating the hydroxide with $NH_4OH$ at a pH 10. The precipitate was washed and filtered and dried at 200° C. for 24 hours to form insoluble hydrous thorium oxide.

Twenty grams of $ThO_2xH_2O$ were ball milled with 5 grams of concentrated phosphoric acid and 5 grams of $ZrO_2$ for 18 hours. This material was dried at 160° C. for 15 hours, granulated, and pressed into 2-inch membranes .020 inch thick, at 15 tons total load. The membranes were sintered at 500° C. for 24 hours.

These membranes had an ion-exchange capacity of 3.8 meq./gm.; conductivity was .03 ohm$^{-1}$-cm.$^{-1}$ at 90° C. and 60 percent R.H.; and the modulus of rupture was 950 p.s.i. Membranes prepared from hydrous $ThO_2xH_2O$ without the addition of zirconium phosphate cement were weak and crumbly, and the strength could not be measured Example XIX Hydrous thorium oxide was prepared as described in Example XVIII.

One hundred grams of hydrous thorium oxide were ball milled with 20 grams of titanium oxide and 20 grams of phosphoric acid for 18 hours. This mixture was dried for 15 hours at 150° C., granulated to −32 +80 mesh and pressed into 2-inch diameter membranes .030 inch thick, at 15 tons total load. The membranes were sintered at 300° C. for 24 hours. The sintered membranes had an ion-exchange capacity of 3.5 meq./gm.; conductivity was 0.025 ohm$^{-1}$-cm.$^{-1}$ at 90° C. and 60 percent R.H., and the modulus of rupture was 940 p.s.i.

Example XX

Hydrous $TiO_2xH_2O$ was prepared by the method previously described in Example IV. 100 grams of hydrous $TiO_2xH_2O$ were bonded with 20 grams of a hydraulic calcium-alumino-silicate cement and membranes 2 inches in diameter and .030 inch thick were cast in Teflon® (tetrafluoroethylene) molds. After curing at room temperature and 80% R.H. for 7 days the membranes were dried at 110° C. for 24 hours. These membranes had an ion-exchange capacity of 2.9 meq./gm.; the conductance at 90° C. and 60% R.H. was .04 ohm$^{-1}$-cm.$^{-1}$; and the modulus of rupture was 825 p.s.i.

Example XXI

Insoluble $ZrO_2xH_2O$ was prepared as described in Example V. Fifty grams of this material were ball milled for 18 hours with 25 grams of $H_3BO_3$ and 50 ml. of water. After drying at 160° C. for 15 hours, it was granulated, pressed into 2 inch diameter membranes .020 inch thick at 15 tons total load and sintered for 24 hours at 160° C. These membranes had an ion-exchange capacity of 3.1 meq./gm.; conductivity was .03 ohm$^{-1}$-cm.$^{-1}$ at 90° C. and 60% R.H.; and the modulus of rupture was 890 p.s.i.

Example XXII

Insoluble $ZrO_2xH_2O$ was prepared as described in Example V. Fifty grams of this material were ball milled for 18 hours with 25 grams of $H_2WO_4$ and 50 ml. of water. After drying at 160° C. for 15 hours, it was granulated, pressed into 2 inch diameter membranes .020 inch thick at 15 tons total load and sintered for 24 hours at 160° C. These membranes had an ion-exchange capacity of 3.2 meq./gm.; conductivity was .03 ohm$^{-1}$-cm.$^{-1}$ at 90° C. and 60% R.H.; the modulus of rupture was 910 p.s.i.

Example XXIII

Insoluble $ZrO_2xH_2O$ was prepared as described in Example V. Fifty grams of this material were ball milled for 18 hours with 25 grams of $HA_5O_2$ and 50 ml. of water. After drying at 160° C. for 15 hours, it was granulated, pressed into 2 inch diameter membranes .020 inch thick at 15 tons total load and sintered for 24 hours at 160° C. These membranes had an ion-exchange capacity of 3.5 meq./gm.; conductivity was .03 ohm$^{-1}$-cm.$^{-1}$ at 90° C. and 60% R.H.; modulus of rupture was 920 p.s.i.

With any of the foregoing examples, a similar decrease in adhesive content results in a similar percentage decrease in modulus of rupture strength.

As but one embodiment of the combination of alternating patterns of anion and cation membranes formed by our invention for the eletcrodialysis of NaCl in water, the figure depicts one cell unit schematically. The numerals 10a, 10b and 10c indicate hydrous bismuth oxide anion selective membranes made pursuant to Example IX of our invention; the alternate membranes 12a, 12b and 12c comprise hydrous antimony oxide which are made in accordance with Example IX of our invention. The entire spaced membrane assembly or stack is positioned in an anode 16 and a cathode 18.

The ionized salt solution is fed to the compartments 20, 22, 24, 26, 28, 30 and 32 and is split into three streams labeled the concentrating stream, the diluting stream and the electrolyte stream. The concentrating stream passes through compartments 24 and 28; the diluting stream passes through compartments 22, 26 and 30; and the electrolyte stream passes through two compartments 22 and 32. The passage of Na$^+$ ions and Cl$^-$ ions is shown graphically in the figure, the Na$^+$ ions passing through cation selective membranes 12a, 12b and 12c, while the Cl$^-$ ions pass through anion selective membranes 10a, 10b and 10c.

At a feed rate of solution into the cell of approximately 250 ml./min. and a current density of 30 ma./cm.$^2$ at 5.0 volts, the salt solution was demineralized at 40–50 ml./min. In a typical run the normality of a 5 liter batch was reduced from 0.928 N to 0.025 N in approximately 30 minutes. This was equivalent to a reduction of the salt solution from 54,000 p.p.m. to 1,330 p.p.m.

The acid salts operative as membranes in our invention may be defined as water insoluble acid addition products of an hydrous metal oxide and an acid or a salt of the acid. The hydrous metal oxide is prepared as described herein, so that the amount of bound water present is more than about 1 percent but less than 50 percent of the total hydrated capacity of the hydrous metal oxide and, as stated earlier, in most cases, the bound water present is much preferred to be less than 10 percent of the total capacity of the hydrous metal oxide to be hydrated. The hydrous metal oxide may have certain additives incorporated therein to increase thermal stability, such as CaO, asbestos fibres and certain refractory fillers.

The acid employed is generally a multivalent acid inasmuch as it is found that stronger membranes are produced when multiple linkages between the acid and the hydrous metal oxides are involved. Preferably, the multivalent acid is an oxygenated acid. The acids and salts thereof include an oxygenated anion having a metal selected from the group consisting of P, Si, Ta, Sb, W, B, Nb, As, S, Se, Te, Po, V and Mo, e.g., phosphoric acid, molybdic acid, or sodium tungstate.

Thus, for example, hydrous titanium oxide or hydrous zirconium oxide prepared by precipitation in accordance with Examples IV and V, respectively, herein, may be admixed with a multivalent acid such as tungstic acid, metavanadic acid, molybdic acid, sulphuric acid, phosphoric acid, boric acid, arsenius acid, or phosphomolybdic acid, in a ball mill or other high speed mixer in equal weight proportions, then dried at 150° C. for 15 hours, pulverized, pressed and sintered. The drying temperature, pressure and sintering temperature limitations and permissible variations are the same as those described in the preparation of the hydrous metal oxides. The resulting membrane has good strength, conductivity and cation-exchange capacity. The predominant structure of the membrane is that of an acid salt, and it appears that where the membrane structure is predominantly that of an acid salt, i.e., above about 50 percent by weight of the membrane, that no extraneous cementing substances are required. This, it will be noted, is not the case where the predominant structure, i.e., above about 50 percent by weight of the membrane, is that of the hydrous metal oxide membrane. In this type of membrane, an adhesive or bonding agent is required, even though the adhesive itself may be an acid salt of a hydrous metal oxide and have some ion-exchange capacity.

It should also be noted that the making of an acid salt membrane, as has been generally described to this point, cannot be made by merely precipitating the acid salt from aqueous solutions of the metal oxide and the anion, and then pressing and sintering the resulting precipitate. In order to make an acid salt membrane of high strength, one must initiate the reaction of the particular anion involved with an hydrous metal oxide having a limited water of hydration, as stated above, in order for the bonding action during pressing and sintering to take place. Why this phenomenon should take place is not completely understood, and is very surprising. It is theorized that, in aqueous solution, the metal oxide is totally hydrated and cannot undergo the reactions necessary for the subsequent bonding of the particles during pressing and sintering.

Specific examples of the preparation of several acid salts, illustrating the concepts of our invention, follow:

ACID SALTS

Example XXIV

Zirconium phosphate membranes were prepared by ball milling 450 grams of hydrous $ZrO_2$ with 450 grams of concentrated phosphoric acid for 18 hours. This material was dried for 15 hours at 160° C., granulated to $-32 +80$ mesh particles and pressed into 2-inch discs, .020 inch thick, at 15 tons total load and sintered at 300° C. for 24 hours. The membranes had an ion-exchange capacity of 4.3 meq./gm.; electrical conductivity was .04 ohm$^{-1}$-cm.$^{-1}$ at 90° C. and 60 percent R.H. and the modulus of rupture was 3,950 p.s.i.

Example XXV

Inorganic membranes were prepared by ball milling 44.3 grams of concentrated sulphuric acid with 44.3 grams of zirconium oxide for 3 hours, drying this material for 17 hours at 120° C., granulating it as in Example XXIV and pressing 2-inch discs .020 inch thick at 15 tons total load. These membranes were sintered at 500° C. for 17 hours. The ion-exchange capacity was 3.6 meq./gm.; electrical conductivity was .03 ohm$^{-1}$-cm.$^{-1}$ at 90° C. and 70 percent R.H.; and the modulus of rupture was 800 p.s.i.

Example XXVI

Titanium molybdate membranes were prepared by ball milling 40 grams of hydrous $TiO_2$ prepared in accordance with the procedure described in Example IV, 40 grams of molybdic acid (85%), and 45 grams of water for 4 hours, drying this material for 15 hours at 110° C., granulating as in Example XXIV, and pressing into 2-inch discs, .020 inch thick, at 15 tons total load. The membranes were sintered at 300° C. for 24 hours. They had an ion-exchange capacity of 3.8 meq./gm.; electrical conductivity was .03 ohm$^{-1}$-cm.$^{-1}$ at 90° C. and 60 percent R.H.; and the modulus of rupture was 910 p.s.i.

Example XXVII

Hydrous titanium dioxide was prepared as described in Example IV. One hundred grams of this material were ball milled with 100 grams of concentrated phosphoric acid for 18 hours. After ball milling, this material was dried for 15 hours at 150° C., granulated to $-32 +80$ mesh and pressed into 2-inch diameter membranes .030 inch thick, at 15 tons total load. The membranes were sintered at 300° C. for 24 hours.

The sintered membranes had an ion-exchange capacity of 3.0 meq./gm.; conductivity at 90° C. and 60 percent R.H. was .03 ohm$^{-1}$-cm.$^{-1}$; and the modulus of rupture was about 2,000 p.s.i.

While various methods of manufacture of the hydrous metal oxide membranes and acid salt membranes of our invention have been disclosed, modifications thereof will become apparent to those skilled in the art that lie within the scope of our invention. Hence, we intend to be limited only to the claims which follow.

We claim:
1. A method of making a water-insoluble inorganic membrane, having ion-exchange properties which comprises the steps of:
 preparing a particulate water-insoluble hydrous metal oxide containing more than about one percent bound water and containing less than about fifty percent bound water of the total capacity of said hydrous metal oxide to be hydrated;
 pressing said particulate hydrous metal oxide under a pressure of at least 2000 p.s.i., in the presence of an adhesive, to form a thin member;
 and heating and chemically bonding said thin member at a temperature of between about 150° C. to about 500° C. to form said membrane.

2. The method of claim 1 wherein the metallic element in said hydrous metal oxide falls within Group III through Group VIII of the Periodic Table of Elements.

3. The method of claim 1 wherein the metallic element in said hydrous metal oxide is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce and Yb.

4. The method of claim 1 wherein said adhesive is selected from the group consisting of acidic metal salts, and alkaline earth and alkali metal silicates and aluminosilicates and comprises less than fifty percent, by weight, of said membrane.

5. The method of claim 1 wherein said adhesive is an acid salt selected from the group consisting of tungstates, borates, arsenates, phosphates, sulphates, vanadates, molybdates and phosphomolybdates.

6. The method of claim 1 wherein said adhesive is zirconium phosphate.

7. The method of claim 1 wherein said hydrous metal oxide is hydrous zirconium dioxide and said adhesive is zirconium phosphate.

8. A method of making a water-insoluble inorganic membrane, having ion-exchange properties, which comprises the steps of:
precipitating a water-insoluble hydrous metal oxide from basic aqueous solution;
drying said precipitate of said hydrous metal oxide at a temperature of less than about 500° C. and for a sufficient period of time so that said hydrous metal oxide contains more than about one percent but less than about fifty percent bound water of the total capacity of said hydrous metal oxide to be hydrated;
comminuting said precipitate to form a particulate hydrous metal oxide;
pressing said particulate hydrous metal oxide under a pressure of at least 2000 p.s.i., in the presence of an adhesive having ion exchange properties to form a thin member;
and heating and chemically bonding said thin member at a temperature of between about 150° C. to about 500° C. to form said membrane.

9. The method of claim 8 wherein the metallic element in said hydrous metal oxide falls within Group III through Group VIII of the Periodic Table of Elements.

10. The method of claim 8 wherein the metallic element in said hydrous metal oxide is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb.

11. The method of claim 8 wherein said adhesive is an acid salt having ion exchange properties and comprises less than fifty percent, by weight, of said membrane.

12. A method of making a water-insoluble inorganic membrane, having ion-exchange properties, which comprises the steps of:
precipitating a water-insoluble hydrous metal oxide from basic aqueous solution by reaction of a water-soluble salt of a metal selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb with a substance selected from the group consisting of an acid and an hydroxide;
drying said precipitate of said hydrous metal oxide at a temperature of less than about 500° C. and for a sufficient period of time so that said hydrous metal oxide contains more than about one percent but less than about fifty percent bound water of the total capacity of said hydrous metal oxide to be hydrated;
comminuting said precipitate to form a particulate hydrous metal oxide;
pressing said particulate hydrous metal oxide under a pressure of between about 2000 p.s.i. to about 20,000 p.s.i. in the presence of less than about fifty percent, by weight of an adhesive which is one having ion exchange properties, to form a thin cohesive member;
and heating and chemically bonding said thin cohesive member at a temperature of between about 150° C. to about 500° C. for between 72 hours and 4 hours, respectively, to form said membrane.

13. A method of making a water-insoluble inorganic membrane, having ion-exchange properties, which comprises the steps of:
preparing a particulate water-insoluble hydrous metal oxide containing more than about one percent bound water and containing less than about fifty percent bound water of the total capacity of said hydrous metal oxide to be hydrated;
converting the majority of said particulate hydrous metal oxide to an acid salt;
drying the product of said conversion at a temperature of below about 500° C.;
comminuting said product of said conversion;
bonding the product of said conversion under a pressure of at least 2000 p.s.i. to form a thin member;
and heating said thin member at a temperature of between about 150° C. to about 500° C. to form said membrane.

14. The method of claim 13 wherein the metallic element in said hydrous metal oxide falls within Group III through VIII of the Periodic Table of Elements.

15. The method of claim 13 wherein the metallic element in said hydrous metal oxide is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce and Yb.

16. A method of making a water-insoluble inorganic membrane, having ion-exchange properties, which comprises the steps of:
precipitating a water-insoluble hydrous metal oxide from basic aqueous solution by reaction of a substance selected from a water soluble acid or base with a water-soluble salt of the metal;
drying said precipitate of said hydrous metal oxide at a temperature of less than about 500° C. and for a sufficient period of time so that said hydrous metal oxide contains more than about one percent but less than about fifty percent bound water of the total capacity of said hydrous metal oxide to be hydrated;
comminuting said precipitate to form a particulate hydrous metal oxide;
converting the majority of said particulate hydrous metal oxide to an acid salt;
drying the product of said conversion at a temperature of below about 500° C.;
comminuting said product of said conversion;
bonding the product of said conversion under a pressure of at least 2000 p.s.i. to form a thin member;
and heating said thin member at a temperature of between about 150° C. to about 500° C. to form said membrane.

17. The method of claim 16 wherein the metallic element in said hydrous metal oxide falls within Group III through VIII of the Periodic Table of Elements.

18. The method of claim 16 wherein the metallic element in said hydrous metal oxide is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb.

19. A method of making a water-insoluble inorganic membrane, having ion-exchange properties, which comprises the steps of:
precipitating a water-insoluble hydrous metal oxide from basic aqueous solution by reaction of a water-soluble salt of a metal selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb with a substance selected from the group consisting of an acid or base;
drying said precipitate of said hydrous metal oxide at a temperature of less than about 500° C. and for a sufficient period of time so that said hydrous metal oxide contains more than about one percent but less than about fifty percent bound water of the total capacity of said hydrous metal oxide to be hydrated;
comminuting said precipitate to form a particulate hydrous metal oxide;
converting said particulate hydrous metal oxide to an acid salt by reaction of said particulate hydrous metal oxide with a multivalent acid;
drying the product of said conversion at a temperature of below about 500° C.;
comminuting said product of said conversion;
subjecting said product of said conversion to a pressure of between about 2000 p.s.i. and 20,000 to form a thin member;
and heating said thin member at a temperature of between about 150° C. to about 500° C. for between 72 hours and 4 hours, respectively, to form said membrane.

20. The method of claim 19 wherein said product of conversion has intermixed therein, prior to being subjected to pressure, minor amounts of fibrous fillers.

21. The method of claim 19 wherein said hydrous metal oxide has intermixed therein a minor percentage of calcium oxide.

22. The method of claim 19 wherein said multivalent acid is selected from the group consisting of tungstic acid, metavanadic acid, molybdic acid, sulphuric acid, phosphoric acid, boric acid, arsenius acid and phosphomolybdic acid.

23. A water-insoluble ion-exchange membrane which consists essentially of:
 a water-insoluble hydrous metal oxide containing between one percent and fifty percent bound water of its total capacity to be hydrated; and
 a chemically bonded adhesive selected from the group consisting of insoluble acid salts, alkaline earth and alkali metal silicates and alumino-silicates.

24. The water-insoluble ion-exchange membrane of claim 23 wherein the metallic element of said hydrous metal oxide falls within the Group III to VIII of the Periodic Table of Elements.

25. The water-insoluble ion-exchange membrane of claim 24 wherein said metallic element in said hydrous metal oxide is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb.

26. The water-insoluble ion-exchange membrane of claim 23 wherein said adhesive is an insoluble acid salt of an hydrous metal oxide having ion-exchange properties.

27. The water-insoluble ion-exchange membrane of claim 22, wherein said adhesive is zirconium phosphate.

28. A water-insoluble ion-exchange membrane which consists essentially of:
 a water-insoluble hydrous metal oxide containing between about one percent and less than ten percent bound water of its total capacity to be hydrated, the metallic element of said hydrous metal oxide being selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb, said hydrous metal oxide being chemically bound into a membrane by an adhesive which is an insoluble acid salt having ion-exchange properties.

29. A water-insoluble ion-exchange membrane which consists essentially of:
 the chemical reaction product of an acid with an hydrous metal oxide containing between about one percent and less than ten percent bound water of its total capacity to be hydrated, the metallic element of said hydrous metal oxide being selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce, and Yb.

30. A method of making a water-insoluble inorganic membrane, having ion-exchange properties which comprises the steps of preparing a particulate water-insoluble hydrous metal oxide containing more than about one percent bound water and containing less than about fifty percent bound water of the total capacity of said hydrous metal oxide to be hydrated, forming in situ an adhesive by converting a portion of said hydrous metal oxide to an acid salt, pressing said particulate hydrous metal oxide and said acid salt under a pressure of at least 2,000 p.s.i. in the presence of said acid salt to form a thin member, and heating and chemically bonding said thin member at a temperature of between about 150° C. to about 500° C. to form said membrane.

References Cited
UNITED STATES PATENTS

| | | | |
|---|---|---|---|
| 3,033,641 | 5/1962 | Thomas | 23—1 |
| 3,056,647 | 10/1962 | Amphlett | 23—145 |
| 3,162,607 | 12/1964 | Burbidge et al. | 252—477 |
| 3,235,089 | 2/1966 | Burroughs | 210—510 |

OTHER REFERENCES

Journal of Inorganic Nuclear Chemistry, 1958, vol. 6, p. 220.

JOHN H. MACK, Primary Examiner.

D. R. JORDAN, Assistant Examiner.

U.S. Cl. X.R.

204—180; 252—454, 449, 461